United States Patent
Li

(10) Patent No.: US 7,707,441 B2
(45) Date of Patent: Apr. 27, 2010

(54) METHOD AND SYSTEM FOR REDUCING POWER CONSUMPTION OF HANDSETS THROUGH UART AUTO FLOW CONTROL

(75) Inventor: Weidong Li, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1255 days.

(21) Appl. No.: 10/971,651

(22) Filed: Oct. 22, 2004

(65) Prior Publication Data

US 2006/0090091 A1   Apr. 27, 2006

(51) Int. Cl.
*G06F 1/26* (2006.01)
(52) U.S. Cl. .................................................. 713/320
(58) Field of Classification Search ................. 713/300, 713/322
See application file for complete search history.

(56) References Cited

U.S. PATENT DOCUMENTS

| | | | |
|---|---|---|---|
| 5,619,544 A | | 4/1997 | Lewis et al. |
| 6,105,142 A | * | 8/2000 | Goff et al. ................... 713/324 |
| 6,167,078 A | | 12/2000 | Russo |
| 6,601,178 B1 | * | 7/2003 | Gulick ....................... 713/322 |
| 2003/0196127 A1 | * | 10/2003 | Olsen .......................... 713/300 |
| 2004/0041029 A1 | * | 3/2004 | Postman et al. ........... 235/462.3 |
| 2006/0055958 A1 | * | 3/2006 | Kim et al. ................... 358/1.14 |
| 2006/0069934 A1 | * | 3/2006 | Esch et al. ................... 713/300 |

OTHER PUBLICATIONS

European Search Report dated Sep. 19, 2007.

\* cited by examiner

*Primary Examiner*—Thomas Lee
*Assistant Examiner*—Mohammed H Rehman
(74) *Attorney, Agent, or Firm*—McAndrews, Held & Malloy, Ltd.

(57) ABSTRACT

Certain aspects of reducing power consumption in communication devices may comprise deasserting a signal indicating that an on-chip UART may be ready to receive data. The deasserted signal may be asserted when the on-chip UART is not ready to receive data. The deasserted signal and asserted signal may be a RTS signal or a CTS signal. The signal may be deasserted when an on-chip processor wakes up from a low power state. The deasserted signal may be asserted when an on-chip processor enters a low power state. The on-chip UART may be adapted to receive and process data from an off-chip processor when the signal is deasserted. The data may be queued externally to the on-chip UART by an off-chip processor when the deasserted signal is asserted. The on-chip UART may be adapted to receive an interrupt signal that causes it to wake up from a low power state.

27 Claims, 5 Drawing Sheets

METHOD AND SYSTEM FOR REDUCING POWER CONSUMPTION OF HANDSETS THROUGH UART AUTO FLOW CONTROL

CROSS-REFERENCE TO RELATED APPLICATIONS/INCORPORATION BY REFERENCE

Not Applicable.

FIELD OF THE INVENTION

Certain embodiments of the invention relate to reducing power consumption of handsets. More specifically, certain embodiments of the invention relate to a method and system for reducing power consumption of handsets through UART auto flow control.

BACKGROUND OF THE INVENTION

A universal asynchronous receiver/transmitter (UART) controller is a key device or component that is utilized for serial communication. The UART may be adapted to take bytes of data and transmit individual bits in a sequential fashion. At a destination, a second UART may be adapted to re-assemble these individual bits into complete bytes.

Serial transmission may be used for communication between computers, terminals, modems and other non-networked devices. There are two primary forms of serial transmission: synchronous serial transmission and asynchronous serial transmission. Synchronous serial transmission may require that a sender and receiver share a common clock, or that the sender may provide timing in the form of a strobe or other timing signal so that the receiver knows when to read the next bit of data. Synchronous communication is usually more efficient because only data bits are transmitted between a sender and a receiver, but may be more expensive as extra wiring and circuits may be required to share a clock signal between the sender and receiver. A form of synchronous serial transmission is used with printers and fixed disk devices, which allow data to be sent out on one set of wires while a clock or strobe may be sent on a different wire.

Asynchronous serial transmission may allow data to be transmitted without the sender having to send a clock signal to the receiver. The sender and receiver may agree on timing parameters in advance and special bits may be added to each word that is used to synchronize sending and receiving units. When a word of data is sent to a UART for asynchronous serial transmission, a bit, for example, a start bit may be added before each word to be transmitted. The start bit may be used to alert the receiver that a word of data is about to be sent, and to force the clock in the receiver into synchronization with the clock in the transmitter. These two clocks may be accurate enough to prevent a frequency drift during transmission of remaining bits in the word of data. After the start bit is sent out, individual bits of the word of data may be sent with the least significant bit (LSB) being sent first. When an entire word of data has been sent, a parity bit may be added that is generated by a transmitter. The parity bit may be used by the receiver to perform simple error checking. The transmitter at the end of transmission may send at least one stop bit. When the receiver has received all bits in the word of data, it may check for the parity bits and the stop bit. If the stop bit fails to appear, the UART may consider the entire word of data to be garbled and may report a framing error to a host processor when the word of data is read.

FIG. 1 is a block diagram of an exemplary system illustrating serial communication utilizing UART auto flow control. Referring to FIG. 1, there is shown digital terminal equipment (DTE) 102, digital communication equipment (DCE) 104, two UART's 106 and 108 and a serial communication interface 110. The digital terminal equipment (DTE) 102 may be, for example, a computer that may be adapted to transmit and receive data. The digital communication equipment (DCE) 104 may be, for example, a modem that may be utilized to provide a modulation/demodulation interface between the digital terminal equipment (DTE) 102 and a transmission circuit. The universal asynchronous receiver/transmitter UART 106 and 108 may be adapted to perform parallel-to-serial conversion of digital data to be transmitted and serial-to-parallel conversion of digital data that has been transmitted. The serial communication interface 110 may comprise a plurality of wires that may be coupled so as to implement serial communication.

In operation, serial communication may comprise transmission of one bit of information at a time. The UART 106 and 108 may be utilized as interface chips to implement serial data transmission across the serial communication interface 110. A full-duplex communication system may allow information to be transferred simultaneously in both directions between the DTE 102 and the DCE 104. A half-duplex communication system may allow information to be transferred in both directions between the DTE 102 and the DCE 104, but in only one direction at a time. A simplex communication system may allow information to be transferred in only one direction.

FIG. 2 is a timing diagram illustrating a frame of data that may be transmitted during serial communication utilizing UART auto flow control. Referring to FIG. 2, there is shown a frame of data 200 that comprises one or more idle bits 202, a start bit 204, a 7 bit data frame 206, a parity bit 208 and one or more stop bits 210. The frame of data 200 may be a complete and nondivisible packet of bits and may be a smallest packet of data that may be transmitted. In the RS232 protocol, the idle bit 202 may be true indicating a low voltage level, for example, −12 V, while the start bit 204 may be false indicating a high voltage level, for example, +12 V. The start bit 204 may indicate a start of transmission of data. The parity bit 208 may be utilized to detect errors during transmission of data. To detect even parity, a sum of number of 1's in the frame of data 200 and the parity bit 208 is an even number. Similarly, to detect odd parity, a sum of number of 1's in the frame of data 200 and the parity bit 208 is an odd number. The stop bit 210 may be utilized to signal the end of transmission of data. The RS232 and RS422 protocols may require a frame of data to have a start bit 204, a plurality of data bits 206, a parity bit 208 and one or more stop bits 210.

Most mobile devices such as laptops, PDA's and cell phones, for example are designed to conserve battery life by switching to a sleep mode when the device is not active. In this regard, one or more processors within a particular device may be configured to enter sleep mode, or some power saving mode when the device detects a period of inactivity. For example, the sleep mode automatically turns off a device after it has been unused for a predetermined period of time so as to conserve battery life. When a device is in sleep mode and data is sent to the device, the device takes a while before it wakes up and enters an operational state where it processes the received data. As a result, the device may miss some of the initial characters because of the inherent delay in waking up. Even though some systems may minimize the wakeup time, characters may still be lost.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for reducing power consumption of handsets through UART auto flow control. Aspects of the method may comprise deasserting a signal, which indicates that an on-chip UART may be ready to receive data. The deasserted signal may be asserted when the on-chip UART is not ready to receive data. The deasserted signal and the asserted signal may be a RTS signal or a CTS signal. The signal may be deasserted when an on-chip processor wakes up from a low power state. The deasserted signal may be asserted when an on-chip processor enters a low power state. The on-chip UART may be adapted to receive and process data from an off-chip processor when the signal is deasserted. The data may be queued externally to the on-chip UART by an off-chip processor when the deasserted signal is asserted. The on-chip UART may be adapted to receive an interrupt signal that causes it to wake up from a low power state.

Another embodiment of the invention may provide a machine-readable storage, having stored thereon, a computer program having at least one code section executable by a machine, thereby causing the machine to perform the steps as described in the method and system for reducing power consumption of handsets through UART auto flow control.

In accordance with another embodiment of the invention, a system for reducing power consumption in communication devices may be provided. In this regard, the system may comprise circuitry that may be adapted to deassert a signal, which indicates that an on-chip UART may be ready to receive data. Circuitry may be adapted to assert the deasserted signal when the on-chip UART is not ready to receive data. The deasserted signal and the asserted signal may be a RTS signal or a CTS signal. The signal may be deasserted when an on-chip processor wakes up from a low power state. The deasserted signal may be asserted when an on-chip processor enters a low power state. The on-chip UART may be adapted to receive and process data from an off-chip processor when the signal is deasserted. The data may be queued in a buffer located externally to the on-chip UART by an off-chip processor when the deasserted signal is asserted. The on-chip UART may comprise circuitry that receives an interrupt signal that causes it to wake up from a low power state.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention provide a method and system for reducing power consumption of handsets through UART auto flow control. Aspects of the method may comprise deasserting a signal, which indicates that an on-chip UART may be ready to receive data. The deasserted signal may be asserted when the on-chip UART is not ready to receive data. The deasserted signal and the asserted signal may be a RTS signal or a CTS signal. The signal may be deasserted when an on-chip processor wakes up from a low power state. The deasserted signal may be asserted when an on-chip processor enters a low power state. The on-chip UART may be adapted to receive and process data from an off-chip processor when the signal is deasserted. The data may be queued externally to the on-chip UART by an off-chip processor when the deasserted signal is asserted. The on-chip UART may be adapted to receive an interrupt signal that causes it to wake up from a low power state.

Figure 1:
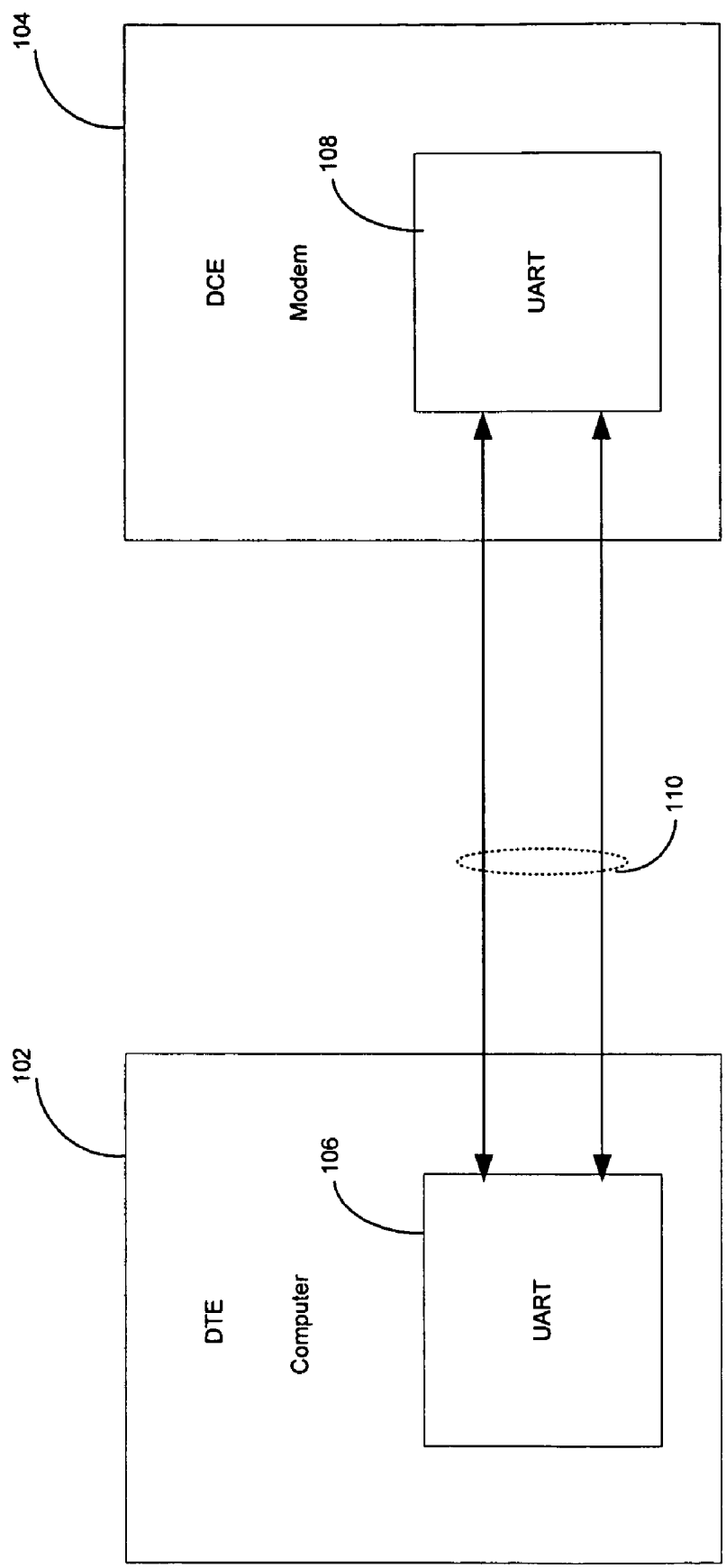
FIG. 1 is a block diagram of an exemplary system illustrating serial communication utilizing UART auto flow control.
Figure 2:
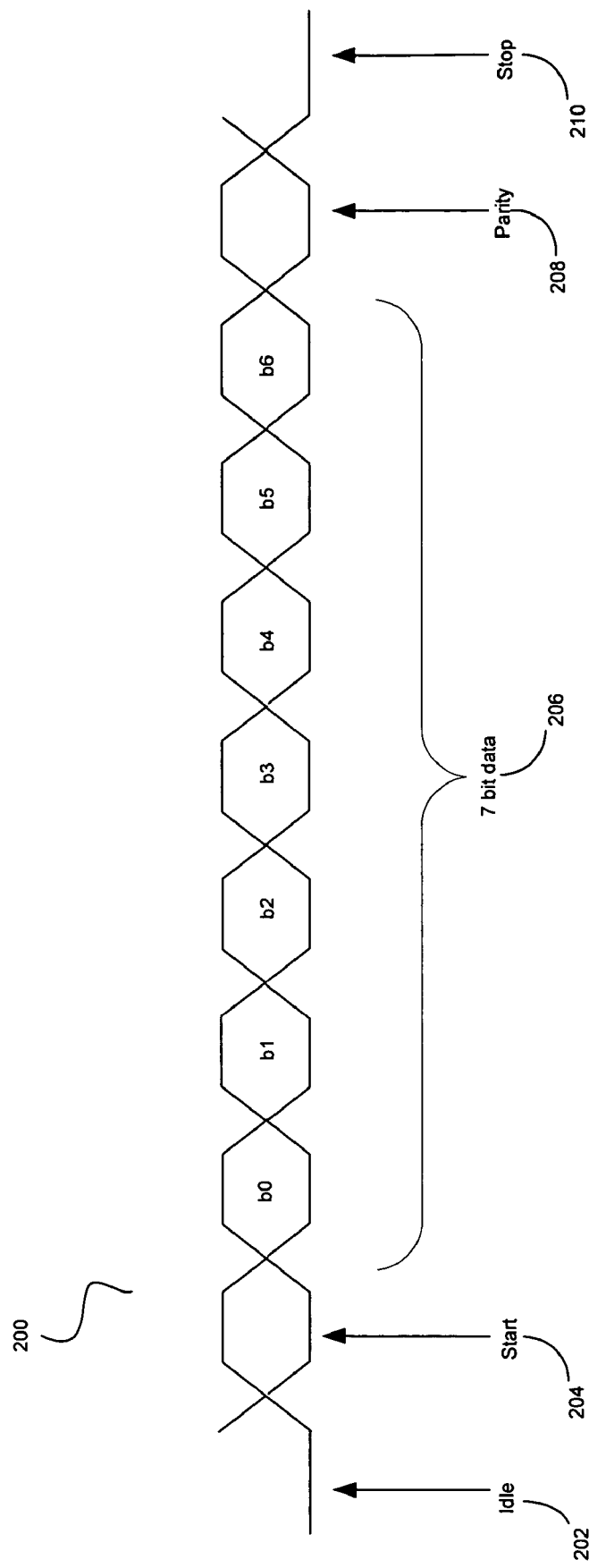
FIG. 2 is a timing diagram illustrating a frame of data that may be transmitted during serial communication utilizing UART auto flow control.
Figure 3:
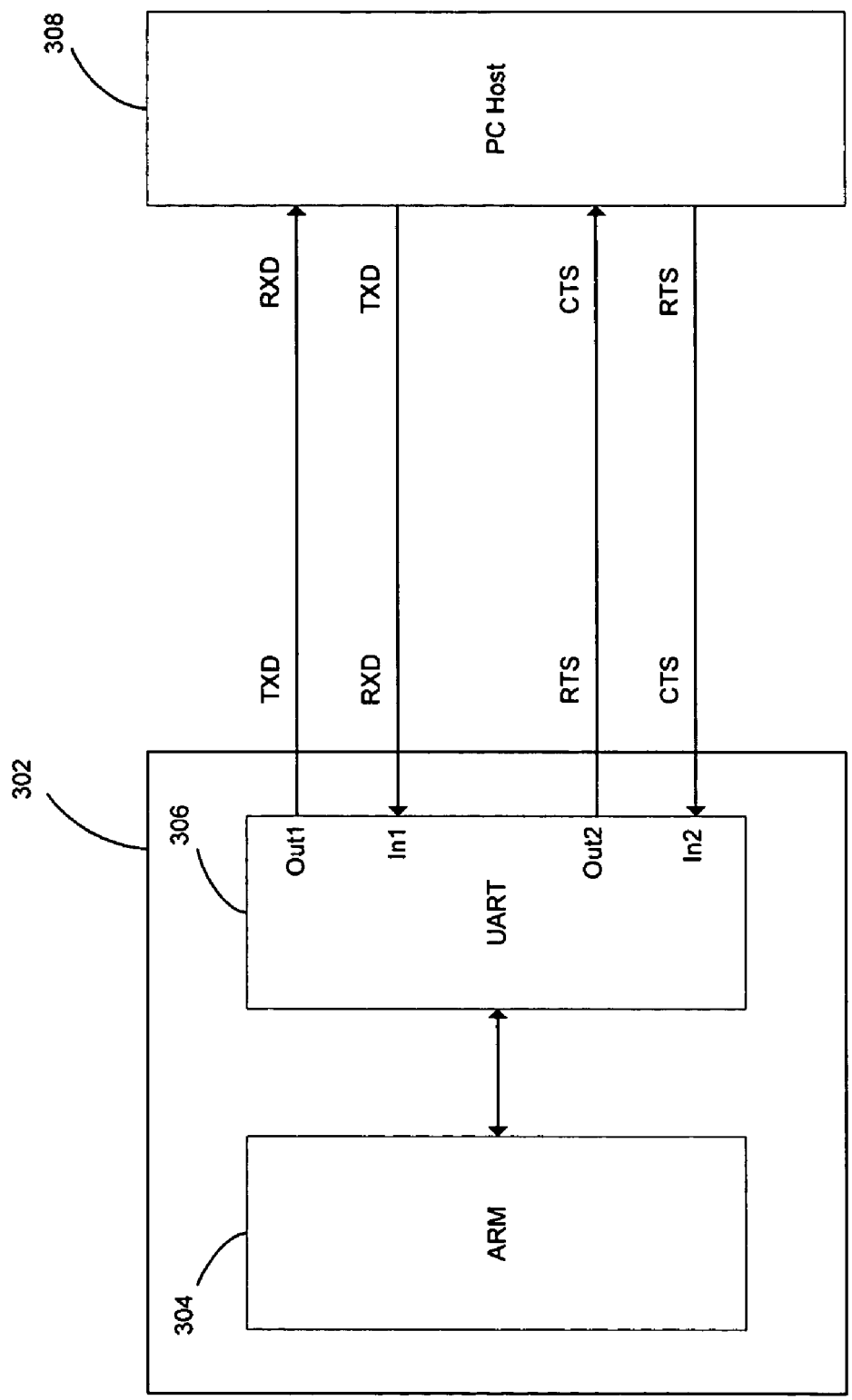
FIG. 3 is a block diagram of an exemplary system for reducing power consumption of handsets by utilizing UART auto flow control in accordance with an embodiment of the invention.

FIG. 3 is a block diagram of an exemplary system for reducing power consumption of handsets by utilizing UART auto flow control in accordance with an embodiment of the invention. Referring to FIG. 3, there is shown a chip 302 that comprises a processor 304 and a universal asynchronous receiver/transmitter UART 306, and a PC Host 308.

The chip 302 may be for example, a baseband processor chip that may be utilized in, for example, GSM/GPRS/EDGE compliant devices. The chip 302 may be adapted to offer a high level of system integration, performance, and features for next generation wireless multimedia handsets and data modules. For low power consumption, accelerators may be extensively utilized for certain necessary computation intensive functions. The chip 302 may comprise analog and digital GSM/GPRS/EDGE baseband processing functions on a single CMOS chip, for example.

The processor 304 may be an ARM processor, for example, or other suitable type of processor and is a fully synthesizable 32-bit RISC processor, which may be adapted to monitor activity at the UART 306 port to check if any data is being received. The universal asynchronous receiver/transmitter UART 306 may be adapted to perform parallel-to-serial conversion of digital data to be transmitted and serial-to-parallel conversion of digital data that has been transmitted. The PC host 308 may be a host computer that provides services and information to a series of other devices.

The UART 306 may comprise at least one input port (IN1, IN2) to receive data RXD from the PC host 308 and at least one output port (OUT1, OUT2) to transmit data TXD to the PC host 308. The UART 306 may be adapted to send out a control signal, request to send (RTS), when the handset is ready to send data. The UART 306 may further be adapted to receive a control signal, clear to send (CTS), when the PC host 308 is ready to receive data.

In operation, the handset may enter a power saving mode such as a deep sleep mode during prolonged periods of inactivity. When the ARM processor 304 prepares to enter a deep sleep mode, a buffer such as a first in first out (FIFO) buffer in the UART 306 may be checked for un-read data. The UART 306 may process any un-read data in the FIFO buffer. A request to send (RTS) bit in the UART 306 may be asserted to inhibit data from the PC host 308. The ARM processor 304 may then enter a deep sleep mode and may disable all clocks in the handset. While, the handset is in deep sleep mode, any data received from the PC host 308 may be queued on the PC host's 308 side until the RTS bit in the UART 306 is deasserted.

The ARM processor 304 may wake up after a short period, for example, every 2 seconds to monitor its paging channel, which may be adapted to carry signaling information for setup and delivery of paging messages from a cell site to a handset. The RTS bit in the UART 306 may be deasserted and any pending received data that is queued up may be processed.

Figure 4:
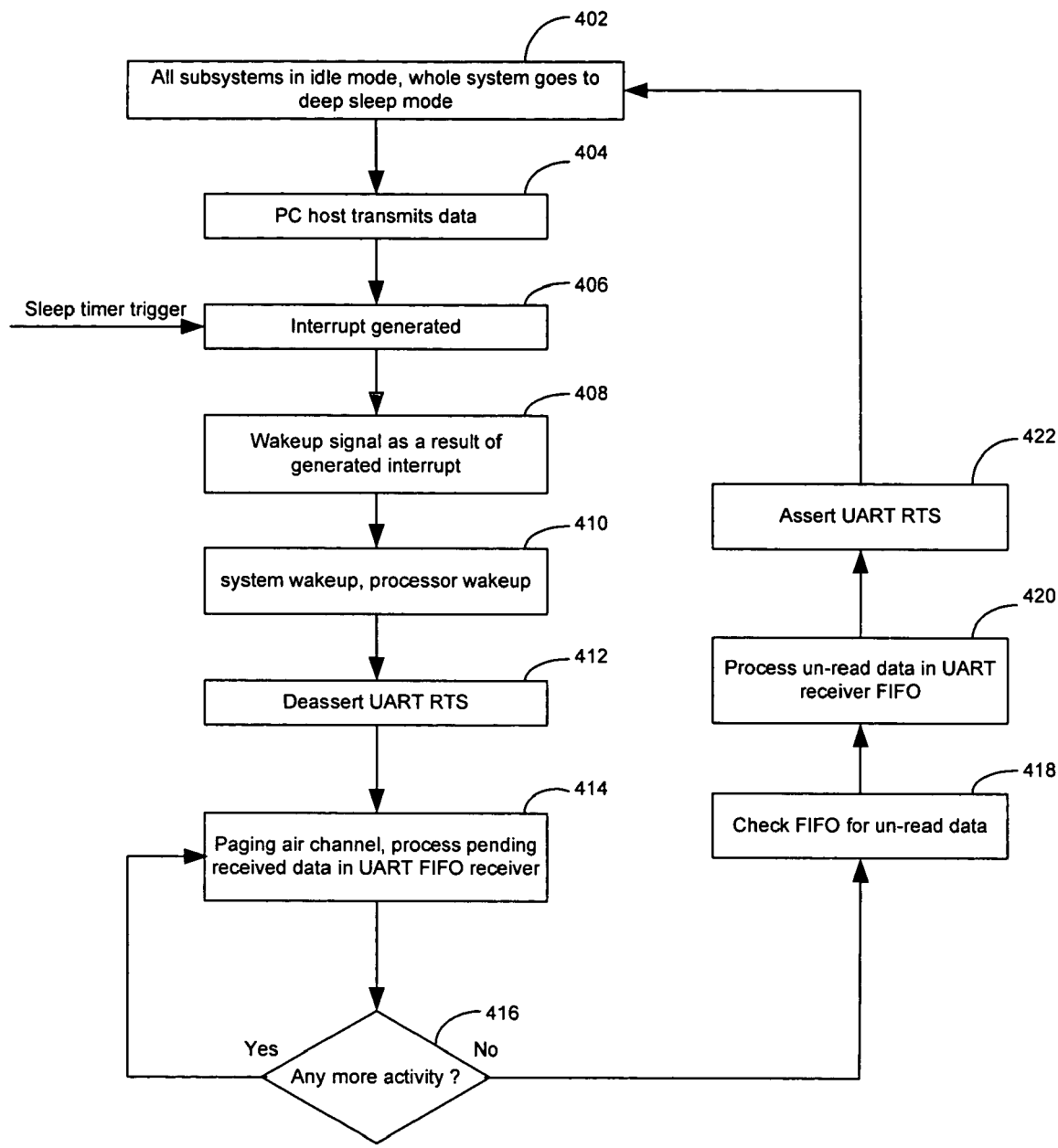
FIG. 4 is a flowchart illustrating exemplary steps for reducing power consumption of handsets by utilizing UART auto flow control in accordance with an embodiment of the invention.

FIG. 4 is a flowchart illustrating exemplary steps for reducing power consumption of handsets by utilizing UART auto flow control in accordance with an embodiment of the invention. Referring to FIG. 4, in step 402, all devices are in idle mode when the system remains idle for a prolonged period, and the system enters a power saving mode, such as a deep sleep mode to reduce power consumption. In step 404, the PC host 308 (FIG. 3) may transmit data to the UART 306. In step 406, an interrupt signal such as a sleep timer trigger may be generated by the ARM processor 304 periodically, for example, every two seconds. In step 408, a wakeup signal may be created as a result of the generated interrupt signal. The interrupt signal such as a sleep timer trigger may wake up the chip 302 and the ARM processor 304 as shown in step 410.

In step 412, a RTS bit in the UART 306 may be deasserted. In step 414, a paging channel may be monitored to carry signaling information for setup and delivery of paging messages from a cell site to a handset. In step 416, the UART 306 may check if PC host 308 is transmitting any more data. If the PC host 308 is still transmitting data, control passes over to step 414 and the paging channel may be monitored for incoming data. When the UART 306 stops receiving data from the PC host 308, control may pass over to step 418. In step 418, the UART receiver FIFO buffer may be checked for un-read data. In step 420, any pending received un-read data that is queued up may be processed. In step 422, the RTS bit in the UART 306 may be deasserted to inhibit data from the PC host 308. Subsequent to step 422, control then passes to step 402, where all subsystems return to an idle mode.

Figure 5:
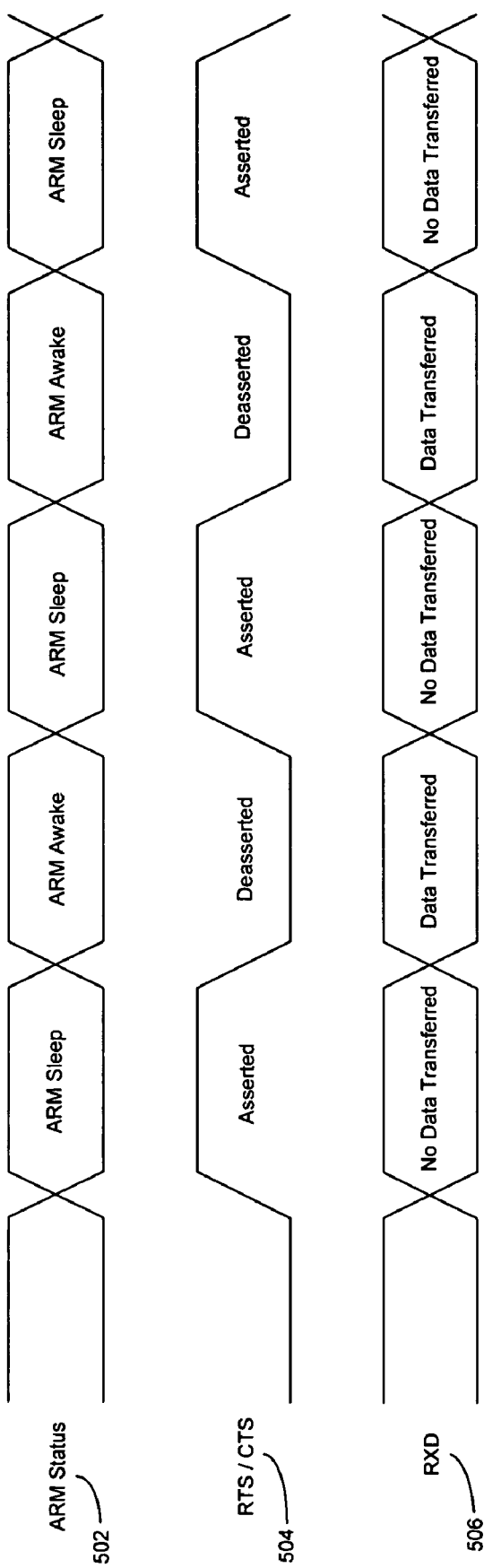
FIG. 5 is a timing diagram illustrating the transmission of data utilizing UART auto flow control in accordance with an embodiment of the invention.

FIG. 5 is a timing diagram illustrating the transmission of data utilizing UART auto flow control in accordance with an embodiment of the invention. Referring to FIG. 5, there is shown an ARM status 502 that indicates when the ARM is in an awake state and when the ARM is in a power saving state such as a sleep state. The RTS/CTS signal 504 may be asserted when the ARM status 502 is in a sleep state and may be deasserted when the ARM status is in an awake state. The RXD 506 may receive transmitted data when the RTS/CTS signal 504 is deasserted and may not receive any data when the RTS/CTS signal 504 is asserted.

In accordance with another embodiment of the invention, a system for reducing power consumption in communication devices may be provided. In this regard, the system may comprise circuitry that may be adapted to deassert a signal, for example a RTS signal, which indicates that an on-chip UART 306 (FIG. 3) may be ready to receive data from a PC host 308. Circuitry may be adapted to assert the deasserted RTS signal when the on-chip UART 306 is not ready to receive data from the PC host 308. The RTS signal may be deasserted when an on-chip processor, for example, an ARM processor 304 wakes up from a low power state. The deasserted RTS signal may be asserted when the on-chip processor 304 enters a low power state. The on-chip UART 306 may be adapted to receive and process data from an off-chip processor, for example, a PC host 308 when the RTS signal is deasserted. The data from the PC host 308 to the on-chip UART 306 may be externally queued in a buffer such as a first in-first out (FIFO) receiver buffer externally when the deasserted RTS signal is asserted. The on-chip UART 306 may comprise circuitry that receives an interrupt signal from the ARM processor 304 that causes the on-chip UART 306 to wake up from a low power state.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for reducing power consumption in communication devices, the method comprising:
deasserting a signal when an on-chip processor wakes up from a low power state, which indicates that an on-chip Universal Asynchronous Receiver/Transmitter (UART) is ready to receive data; and
asserting at least said deasserted signal when said on-chip UART is not ready to receive said data.

2. The method according to claim 1, wherein said deasserted signal and said asserted signal is a RTS signal.

3. The method according to claim 1, wherein said deasserted signal and said asserted signal is a CTS signal.

4. The method according to claim 1, wherein said signal is deasserted when an on-chip processor wakes up from a low power state.

5. The method according to claim 1, wherein said deasserted signal is asserted when an on-chip processor enters a low power state.

6. The method according to claim 1, further comprising receiving said data by said on-chip UART from an off-chip processor when said signal is deasserted.

7. The method according to claim 1, further comprising processing said data by said on-chip UART from an off-chip processor when said signal is deasserted.

8. The method according to claim 1, further comprising queuing said data externally to said on-chip UART by an off-chip processor when said deasserted signal is asserted.

9. The method according to claim 1, further comprising receiving an interrupt signal by said on-chip UART that causes said on-chip UART to wake up from a low power state.

10. A machine-readable storage having stored thereon, a computer program having at least one code section for reducing power consumption in communication devices, the at least one code section being executable by a machine for causing the machine to perform steps comprising:
    deasserting a signal when an on-chip processor wakes up from a low power state, which indicates that an on-chip UART is ready to receive data; and
    asserting at least said deasserted signal when said on-chip UART is not ready to receive said data.

11. The machine-readable storage according to claim 10, wherein said deasserted signal and said asserted signal is a RTS signal.

12. The machine-readable storage according to claim 10, wherein said deasserted signal and said asserted signal is a CTS signal.

13. The machine-readable storage according to claim 10, wherein said signal is deasserted when an on-chip processor wakes up from a low power state.

14. The machine-readable storage according to claim 10, wherein said deasserted signal is asserted when an on-chip processor enters a low power state.

15. The machine-readable storage according to claim 10, further comprising code for receiving said data by said on-chip UART from an off-chip processor when said signal is deasserted.

16. The machine-readable storage according to claim 10, further comprising code for processing said data by said on-chip UART from an off-chip processor when said signal is deasserted.

17. The machine-readable storage according to claim 10, further comprising code for queuing said data externally to said on-chip UART by an off-chip processor when said deasserted signal is asserted.

18. The machine-readable storage according to claim 10, further comprising code for receiving an interrupt signal by said on-chip UART that causes said on-chip UART to wake up from a low power state.

19. A system for reducing power consumption in communication devices, the system comprising:
    circuitry that deasserts a signal when an on-chip processor wakes up from a low power state, which indicates that an on-chip UART is ready to receive data; and
    circuitry that asserts at least said deasserted signal when said on-chip UART is not ready to receive said data.

20. The system according to claim 19, wherein said deasserted signal and said asserted signal is a RTS signal.

21. The system according to claim 19, wherein said deasserted signal and said asserted signal is a CTS signal.

22. The system according to claim 19, wherein said signal is deasserted when an on-chip processor wakes up from a low power state.

23. The system according to claim 19, wherein said deasserted signal is asserted when an on-chip processor enters a low power state.

24. The system according to claim 19, wherein said on-chip UART receives said data from an off-chip processor when said signal is deasserted.

25. The system according to claim 19, wherein said on-chip UART processes said data from an off-chip processor when said signal is deasserted.

26. The system according to claim 19, further comprising a buffer that queues said data externally to said on-chip UART by an off-chip processor when said deasserted signal is asserted.

27. The system according to claim 19, further comprising circuitry that receives an interrupt signal by said on-chip UART that causes said on-chip UART to wake up from a low power state.

* * * * *